United States Patent
Tesmar et al.

(10) Patent No.: US 8,867,129 B2
(45) Date of Patent: Oct. 21, 2014

(54) SIGHTING TELESCOPE

(75) Inventors: Manuela Tesmar, Rosbach v. d. Hohe (DE); Helke Karen Hesse, Giessen (DE); Christoph Hilmar vom Hagen, Giessen (DE)

(73) Assignee: Schmidt & Bender GmbH Co. KG, Biebertal (DE)

( * ) Notice: Subject to any disclaimer, the term of this patent is extended or adjusted under 35 U.S.C. 154(b) by 467 days.

(21) Appl. No.: 13/008,050

(22) Filed: Jan. 18, 2011

(65) Prior Publication Data
US 2013/0318853 A1 Dec. 5, 2013

(30) Foreign Application Priority Data
Jan. 19, 2010 (DE) .......................... 10 2010 005 123

(51) Int. Cl.
*G02B 23/16* (2006.01)
*G02B 7/04* (2006.01)

(52) U.S. Cl.
CPC ........................................ *G02B 7/04* (2013.01)
USPC .......................................................... 359/425

(58) Field of Classification Search
None
See application file for complete search history.

(56) References Cited

U.S. PATENT DOCUMENTS

| | | | | | |
|---|---|---|---|---|---|
| 3,010,367 | A | * | 11/1961 | Miles | 359/402 |
| 3,121,134 | A | * | 2/1964 | Heinzel | 359/422 |
| 3,161,716 | A | * | 12/1964 | Burris et al. | 356/247 |
| 4,584,776 | A | * | 4/1986 | Shepherd | 42/122 |
| 4,964,686 | A | * | 10/1990 | Kato | 359/423 |
| 6,005,711 | A | * | 12/1999 | Mai et al. | 359/424 |
| 6,088,156 | A | * | 7/2000 | Kato | 359/422 |
| 7,185,455 | B2 | * | 3/2007 | Zaderey | 42/122 |
| 2006/0168871 | A1 | * | 8/2006 | Wagner | 42/122 |

FOREIGN PATENT DOCUMENTS

| | | |
|---|---|---|
| DE | 297 20 737 | 2/1998 |
| DE | 20 2006 000977 | 5/2006 |
| DE | 20 2007 001 576 | 6/2007 |

* cited by examiner

*Primary Examiner* — Derek S Chapel
(74) *Attorney, Agent, or Firm* — Clark & Brody

(57) ABSTRACT

A sighting telescope has two image planes situated between an objective and an ocular. A first such plane is situated closer to the objective and a second image plane is closer to the ocular. A reversal system is situated between the first and second image planes containing reversing lens elements. The reversing lens elements for a first and for a second adjustment distance can be adjusted by an adjustment means in a manner that the image in the second image plane shall be parallax-free between the target image and the target mark.

8 Claims, 5 Drawing Sheets

SIGHTING TELESCOPE

FIELD OF THE INVENTION

Background Art

Firearm sighting telescopes are used to magnify the target. Sighting telescopes designed for fixed magnification, as well as with variable magnification, are known. Conventional sighting telescopes are composed of various optical lens elements, a targeting accessory and elevation and laterally adjusting means. The lens elements constitute an optical objective, i.e. a set of cooperating lens elements, a reversal system and an ocular. The magnification of the sighting telescope may be implemented by the reversal system. The sighting telescopes comprise two image planes, one of which is situated near said objective and the other near the ocular. The targeting accessory is configured in at least one of the said image planes. Depending on the application, various target marks such as target marks or illuminating target marks may be used.

A parallax defect may arise when sighting a target using a sighting telescope. Such a defect may take place when the target mark and the object reproduced by the lens elements are not situated in the same plane. That is, the target mark shall be situated outside the image plane. Conventional sighting telescopes provide a parallax-free distance. This distance is typically called the adjustment distance and may vary depending on said sighting telescope's particular applications. At distances which differ from the said adjustment distance, the target no longer may be reliably detected. As a consequence, the marksman's eye is stressed by relatively substantial accommodation and as a result it will tire rapidly.

Besides the above cited design, it is also known to configure the parallax compensation within the objective. This approach however incurs the drawback that said parallax compensation can be implemented only using a displaceable optics and a complex mechanism. These particulars however adversely affect the sighting telescope's weight as well as its dimensions. Accordingly sighting telescopes fitted the parallax compensation within the objective are comparatively less convenient and thereby less appropriate in particular for the extended use of firearms.

Frequently however adjustable sighting telescopes must operate in almost parallax-free manner in magnification zones that are widely apart. Illustratively soldiers must endure prolonged use in the face of different operating conditions requiring different magnifications. Street combat requires small magnifications (triple to five-fold), whereas in open terrain large magnifications (8 to 12 fold) are required. To relieve the soldier from the burden of carrying several sighting telescope, ideally all this options should be combined in one compact sighting telescope.

Accordingly the object of the present invention is to create a sighting telescope which averts the above drawbacks and offers at least two adjustment distances that are quasi-free of parallax, namely one for the near zone and one of the far zone.

SUMMARY OF THE INVENTION

With respect to a sighting telescope comprising two image planes situated between an objective and an ocular, a first such plane being situated closer to the objective and a second image plane closer to the ocular, and a reversal system being situated between said planes containing reversing lens elements, the present invention stipulates that the reversing lens elements for a first and for a second adjustment distance can be adjusted by an adjustment means in a manner that the image in the second image plane shall be parallax-free between the target image and the target mark.

The reversal system together with its reversing lens elements is required anyway for the magnifying operation of the targeting telescope. In the invention however, in addition to the least magnification, the reversing lens elements are adjusted once more relative to each other. As a result, the reversal system is set for a short adjustment distance such as 3 m (10 ft). Within the range of these near distances, there shall be no deviation between target and target mark for this second adjustment distance. The solution of the present invention offers the advantage that the marksman can reliably detect targets within these short distances. Eye fatigue due to constantly changing accommodation between the target mark and the image is averted. The marksman therefore can sight his object longer and more accurately.

The design of the present invention offers the further advantage that its targeting telescope may be made to be very compact and lightweight. A complex mechanism and optics within the objective lens are no longer needed for parallax compensation because the marksman by design can already sight without parallax in his operational zones, namely the near zone near the second adjustment distance as well as the far zone near the first adjustment distance. The superfluity and hence elimination of these complex mechanisms and optics otherwise needed for parallax defects allows manufacturing advantages and operational ruggedness in the sighting telescope of the invention. A saving is weight also is gained.

In especially preferred manner, said adjustment system consists of a guide bush and, inside same, of at lest two mounts supporting the reversing lens elements. This design of the adjustment system assures sturdy and durably accurate support of the reversing lens elements. Preferably the mounts and the guide bush rest in gliding manner relative to each other. As a result the reversing lens elements may be guided accurately within the guide bush absent further technical means. Optical quality is enhanced thereby. Again, the reversing lens elements are easily removed from the mounts, optionally cleaned, or exchanged.

In a further embodiment mode of the invention, the guide bush is mounted in sliding manner in a helical sleeve which is fitted with a first helical recess containing a first drive pin resting in it and guided along its longitudinal axis, and a second helical recess containing a second drive pin also resting in said second recess and guided along its longitudinal axis. The first drive pin is affixed in the first mount and the second drive pin in the second mount. The guide bush also comprises a recess which—contrary to the case of the helical sleeve's recess—runs linearly parallel to the longitudinal axis.

The above design of a kinematic linkage between the helical sleeve and the mount is a way, both simple and highly accurate, to move the reversing lens elements relative to each other. Rotating the helical sleeve on the guide bush will displace the reversing lens elements because they are constrained by the drive pins to track the axial course of the helical recesses.

In especially preferred manner, the helical recesses are path generators that are selected so that the reversing lens elements shall move in a way entailing a change in magnification for which the spacing between the first image plane and the second plane shall remain constant and the reproduction of the first intermediate image on the second one shall be optimal for all magnifications. The second adjustment position of the present invention may be advantageously attained by widening the path generators.

If for instance the angular range within which the helical sleeve may be rotated on the guide bush is 180°, then the magnification range would be over an angle of 0° to 150°. The range between 150° and 180° would be used for refocusing the reversing lens elements. However only the final position, in this case at 180°, would be relevant, the image in the intermediate range of 150° to 179° remaining undefined. The angular range depends solely on the required scope of displacement. Accordingly other values than 180°, for instance 170°, 190° or 200°, may also be considered.

In an important embodiment mode of the present invention, the target mark is a luminous dot. This target mark pattern is a good aiming accessory especially for hurried shooting. The central point firing position offers good detection within a short time interval because the target image is only minimally covered. Because the low strain in accommodation, the luminous dot is extremely useful even in protracted operations.

The second image plane is situated behind the reversal system that includes the magnification means of the sighting telescope. The target mark being positioned in the second image plane, said mark shall not be enlarged respectively reduced when there is a change in magnification, instead remaining unchanged. In this way a fine structure of the target mark is assured over the entire range of magnification. This feature is especially advantageous with respect to flat target mark patterns. Illustratively dot-like target mark patterns may be detected by the human eye very quickly in the absence of intense accommodation and accordingly this feature is operationally highly desirable. On the other hand such a pattern would mask much of the target image when enlarging the sighting accessory. Accordingly positioning the target mark in the second image plane most advantageously makes possible using widely different target mark patterns because the target mark enhances sighting the target and will not mask the target object even at large magnifications. This feature affects most positively the reliability of hitting the target and also enhances the ease of use of the sighting telescope.

Advantageously again, the target mark is one projected into place by a projecting means. Except for the beam splitter, all components required to generate the target mark are configured outside the beam. However the marksman does not perceive the beam splitter. Accordingly, in the off state, this configuration lets the marksman be aware solely of the target mark which is situated in the first image plane. Consequently the design of the present invention creates a sighting telescope exploiting the diverse advantages of sighting accessories in the different image planes. Where the target mark is not needed in the second image plane, it may be shut off, the marksman in that case experiencing no degradation of the target image.

In a preferred embodiment of the invention, the beam splitter is situated in the second image plane. A means is made available to make visible the target mark in the second image plane.

Preferably again, the beam splitter shall be a prism surface slanting relative to the optic axis. In this design, the target mark may be provided in especially simple and economical manner. The beam splitter is an optical component making it possible to view from the ocular the target mark generated by the projection element.

When at least one prism is used as the beam splitter, advantageously the light coming from the objective shall be hardly at all absorbed or reflected compared to the case of a semi-transmitting mirror. As a result, even under poor sighting conditions, the target acquiring optics offers good quality of the target image.

In a further development of the present invention, the beam splitter is constituted by directly abutting boundary surfaces of two prisms, said surfaces slanting relative to the optic axis and the prisms being materials of different refraction indices. Besides the beam splitter ruggedness so attained, further the target mark's contact can be enhanced. Also, by suitable selecting the materials and the angle of inclination, a means is made available by which illustratively only the red light irradiated from the projection element toward the objective shall be reflected whereas the other wavelengths are transmitted. The image incident from the objective then can be superposed on the target mark without any interfering reflection.

Preferably again, at least part of said projection element shall be configured on one of the prisms. This configuration allows initially joining the components to each other and later to be inserted together. Such a configuration moreover is very compact, while the manufacturing procedure is simplified by inserting a pre-fabricated group of parts.

In another design, the projection element comprises a stop. Advantageously a stop fitted with a matching shape of the target mark is an especially economical and simple means to generate different target marks and sizes. Illustratively a luminous dot or a crosshair may be made into a target mark pattern using simple means.

In a further preferred design of the sighting telescope, the projection element is fitted with a battery. This battery reliably assures the projection element's power. Relatively compact batteries are commercially available and therefore hardly affect the optic shape of the sighting telescope on account of the power supply. A replacement battery in the housing offers additional reliability.

In a further preferred design, the light source is fitted with a regulator. This feature is especially advantageous because the sighting telescope may be matched by the regulator to the particular light conditions. Under good light for instance a very low intensity may be selected for the target mark. Consequently the target mark does not overpower the incident target image.

BRIEF DESCRIPTION OF THE DRAWINGS

Further features, particulars and advantages of the present invention are elucidated by the wording of the appended claims and of the description below of embodiments in relation to the appended drawings.

DETAILED DESCRIPTION OF THE INVENTION

Figure 2:
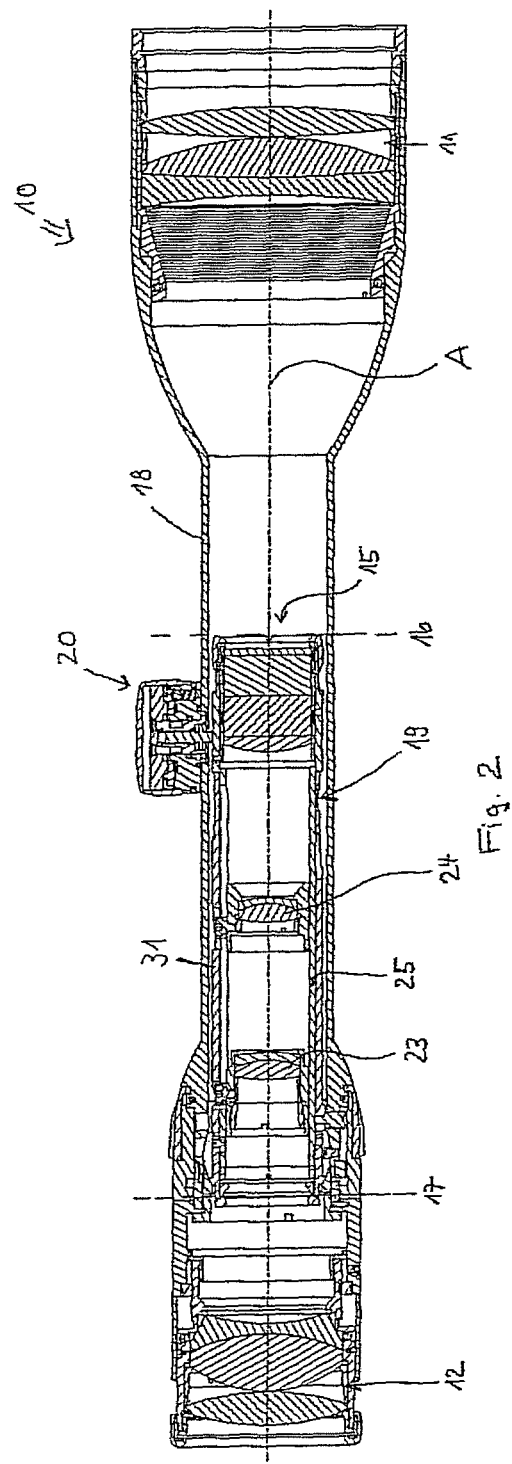
FIG. 2 shows a longitudinal section of the sighting telescope.

FIG. 2 shows a sighting telescope denoted as a whole by the reference 10. The longitudinal section of the sighting telescope 10 shows an outer tube 18 containing an objective 11, an inner tube 19 and an ocular 12. The first image plane 16 and the second image plane 17 are situated between the objective 11 and the ocular 12. A reticle 15 is configured in the first image plane 16. At its side facing the ocular 12, the inner tube 19 rests displaceably in a gimbal joint. An adjustment turret 20 is affixed to the outer tube 18. The adjustment turret 20 is fitted with an implement resting against the inner tube 19. The adjustment turret 20 allows adjusting the inner tube for instance to compensate for side winds. The inner tube 19 comprises a guide bush 25 housing two reversal system lens elements 23, 24 held in two mounts. The reversing lens elements 23, 24 are supported in a way to allow displacement along the optic axis.

Figure 3:
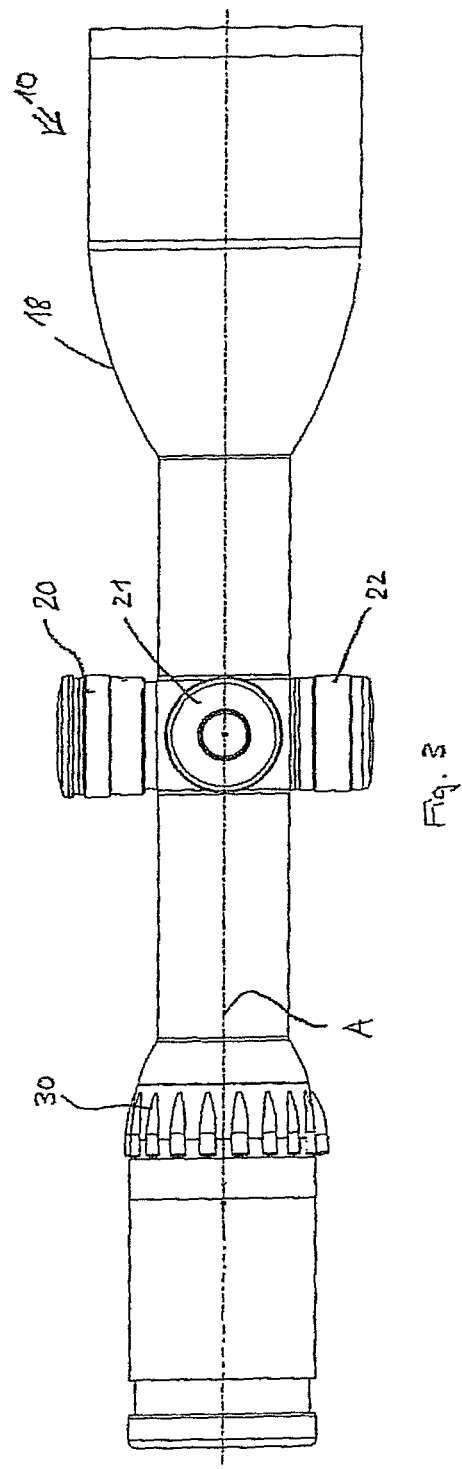
FIG. 3 is a sideview of a sighting telescope.

The sideview shown in FIG. 3 is of a sighting telescope 10 of the state of the art fitted with three adjustment turrets 20, 21, and 22 mounted on an outer tube 18 and also displays an optic axis A. The sighting telescope 10 also is fitted with an adjusting system 30 allowing to control the magnification of said telescope.

Figure 1:
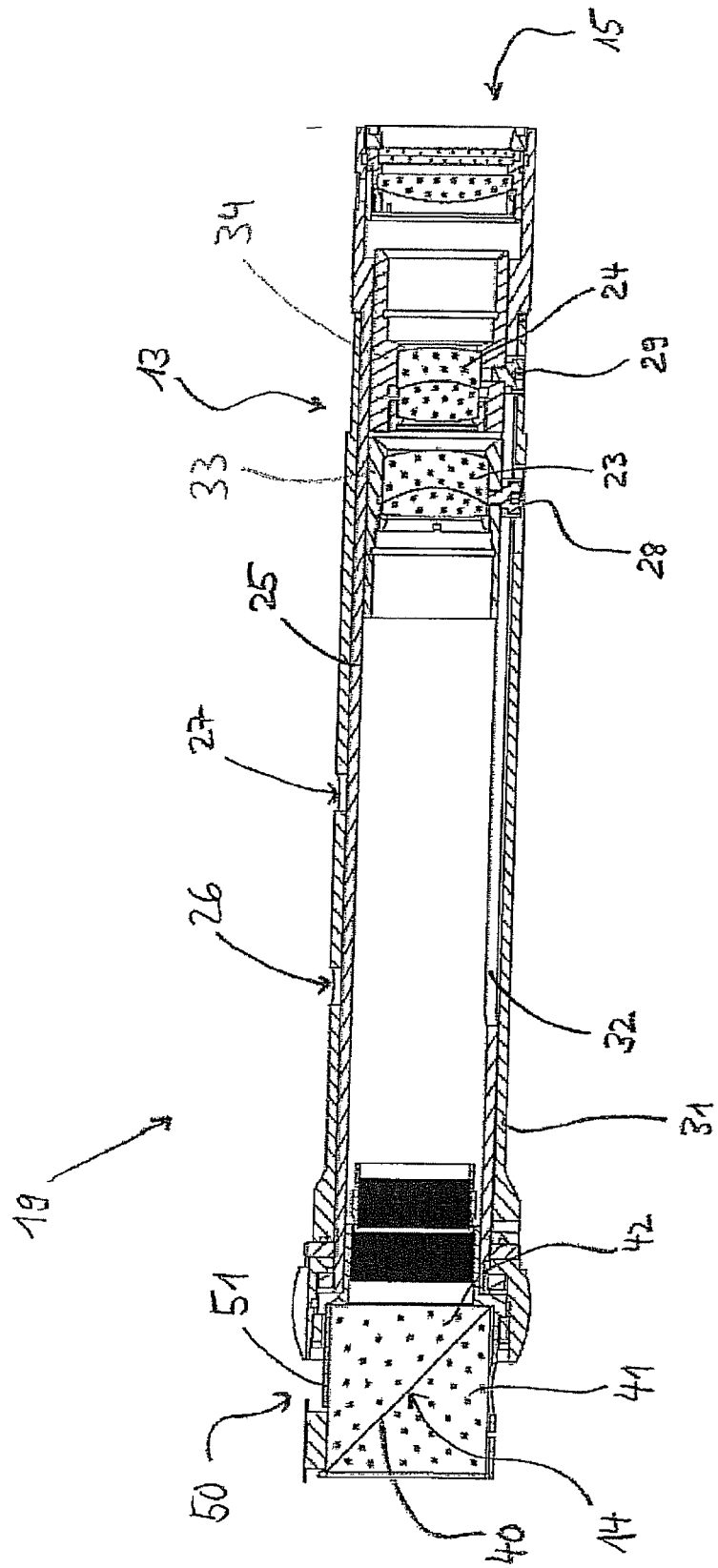
FIG. 1 shows an inner tube of a sighting telescope of the invention.

FIG. 1 shows an inner tube 19 of a sighting telescope 10 of the present invention. The inner tube 19 is fitted with a helical sleeve 31 comprising two helical recesses 26, 27. The helical recesses 26, 27 preferably are in the form of slots. A guide bush 25 is configured within the helical sleeve 31. Preferably the guide bush 25 comprises a recess 32 illustratively in the form of longitudinal slot running parallel to the longitudinal axis of the inner tube 19. A reversal system 13 is configured in the guide bush 25. This reversal system 13 comprises two reversal system lens elements 23, 24 which are fixed in mounts 33, 34 and which may be displaced by a drive pin 28 respectively 29 each resting in one of the helical recesses 26 respectively 27 of the helical sleeve 31.

The inner tube 19 also encloses a beam splitter 40. Said splitter is constituted by directly abutting boundary surfaces of two prisms 41, 42 that may be made of materials of different indices of refraction. A light emitting diode (LED) acting as a light source 51 of a projection element 50 is mounted on the prism 42. Other suitable light sources than the LED also may be used.

The projection element 50 may serve to generate a target mark 14 onto the beam splitter 40. Optionally and/or as needed, the projection element 50 may enclose a stop configured between the light source 51 and the prism 42, said stop being fitted with a recess matching the target mark 14. The projection element 50 also comprises an omitted battery as a power supply and also a dimming regulator that is switchable. A reticle 15 is configured on the side of the inner tube 29 facing the beam splitter 40. The reticle 15 may be a cross-lined grid of which the pattern was made for instance by etching of inserting metal wires. Illustratively the pattern is a crosshair.

Figure 4:
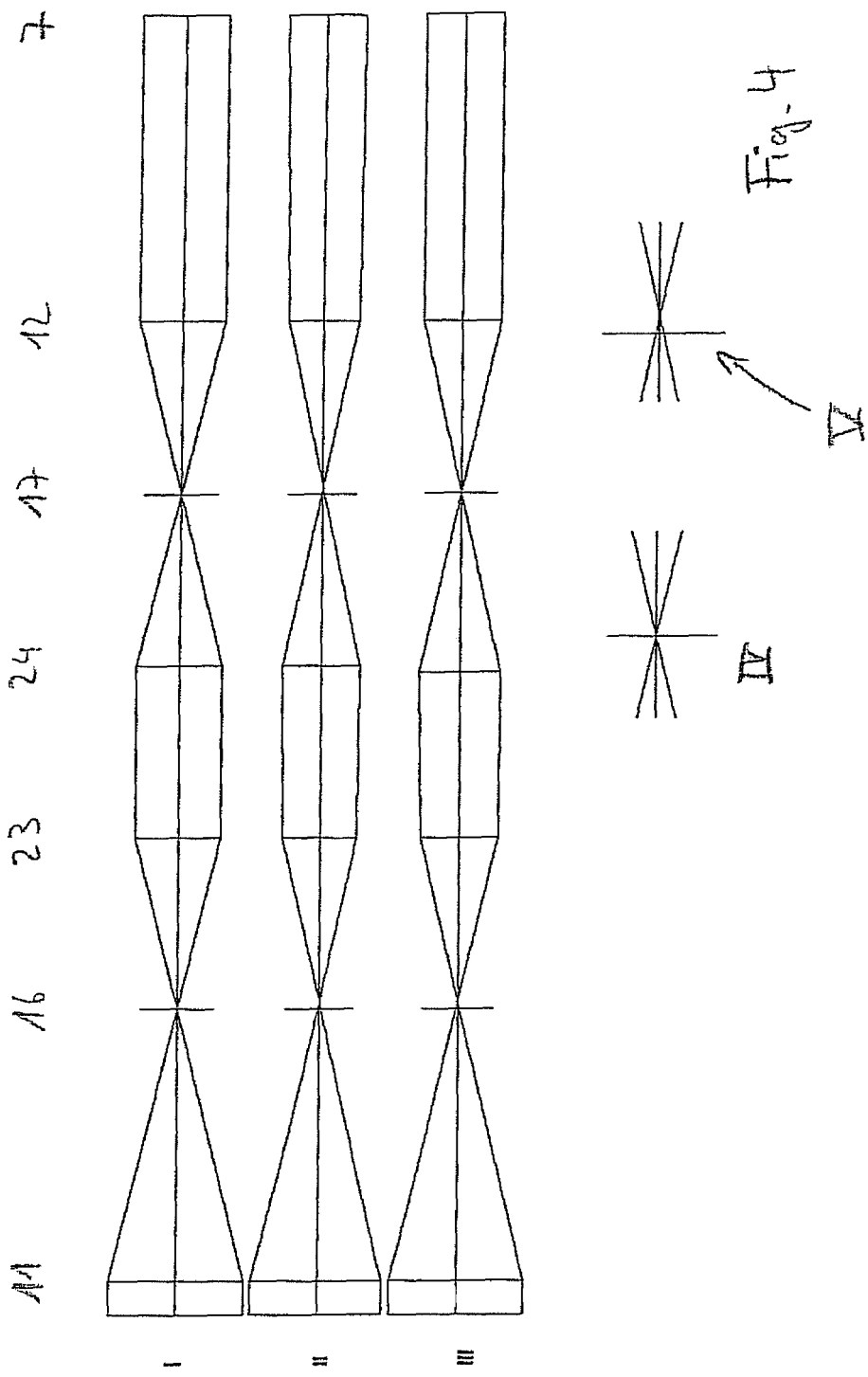
FIG. 4 shows the beam path of a sighting telescope of the invention.

FIG. 4 shows the beam path between the objective 11, the first image plane 16, first reversing lens element 23, second reversing lens element 24, second image plane 17, ocular 12 and exit pupil 7. In state I, the target is situated at the first adjustment distance, the image and the image planes coincide in the two image planes 16, 17 (detail IV). State II shows the objective in the near zone, the image and image plane are not coincident. There is parallax (detail V). For state III, FIG. 4 shows a position wherein the reversing lens elements are arrayed in the present invention in a way that the image and the image plane coincide in the second image plane. The sighting telescope is set for the second adjustment distance.

Figure 5:
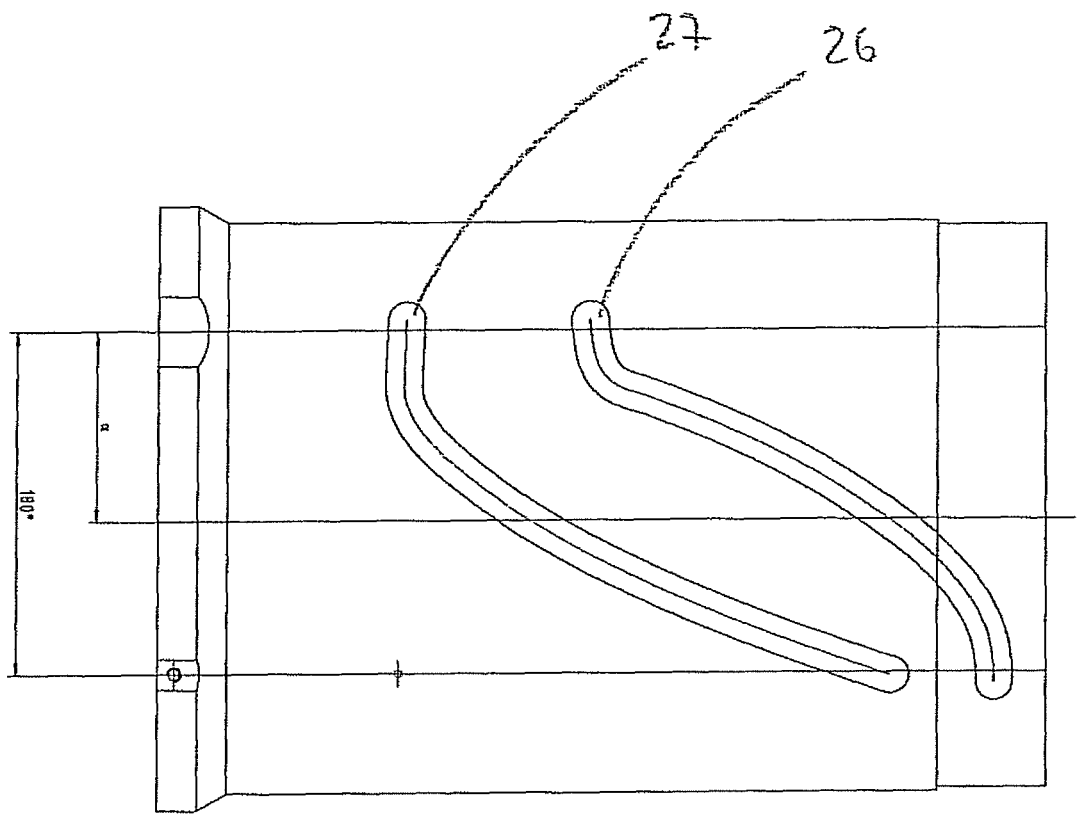
FIG. 5 shows a geometrically developed helical sleeve".

FIG. 5 shows the helically curved paths of the helical recesses which are selected in a manner that the reversing lens elements are displaced for purposes of changes in magnification so that the image separation between the first and second image planes shall remain constant and the reproduction of the first intermediate image onto the second shall be optimal for all enlargements. Advantageously the curved paths may be widened to implement the second adjustment position of the present invention.

The angular range through which the helical sleeve may be rotated on the guide bush may be 180° and then the magnification range would be 180 less alpha, that is restricted to an angular range from 0° to 150°. The range from 150° to 180° would then be used for refocusing the reversing lens elements. However only the final position, in this case 180°, would be pertinent, because the image is undefined in the intermediate range (150° to 179°). The angular range depends solely on the required excursion. Accordingly other values such as 170°, 190° or 200° also may be applicable.

The present invention is not restricted to the above discussed embodiment modes, but may be modified in many ways.

All features and advantages implicit from and explicit in the specification and the drawings, inclusive design details, spatial configurations and procedural steps, may be construed being inventive per se or in arbitrary combinations.

LIST OF REFERENCES

A optic axis
7 exit pupil
10 sighting telescope
11 objective
12 ocular
13 reversal system
14 target mark
15 reticle
16 first image plane
17 second image plane
18 outer tube
19 inner tube
20, 21, 22 adjustment turret
23, 24 reversal system lens element
25 guide bush
26, 27 helical slot/recess
28, 29 drive pin
30 adjustment system
31 helical sleeve
32 recess
33, 34 mounts
40 beam splitter
41, 42 prisms
50 projection element
51 light source

The invention claimed is:

1. A sighting telescope (10) comprising an objective (11) and an ocular (12) and between them two image planes (16, 17), of which a first image plane (16) is configured nearer the objective (11) and a second image plane (17) nearer the ocular (12), and a reversal system (13) together with two reversing lens elements (23, 24) in it being configured between the image planes (16, 17), for a magnification change, both reversing lens elements (23, 24) are adjustable relative to each other and to a first adjustment distance (JA) and a differing second adjustment distance (JB) by means of an adjustment system so that an image in the second image plane (17) is free of parallax between a target image and a target mark (14), the adjustment system further comprising a magnification range and a refocusing range, whereas the refocusing range is positioned near the second adjustment distance, and whereas a refocusing of the reversing lens elements is executable within the refocusing range.

2. Sighting telescope (1) as claimed in claim 1, characterized in that the adjustment system is constituted by a guide bush (25) and by at least two mounts (33, 34) which hold the reversing lens elements (23, 24) and which are configured in said guide bush.

3. Sighting telescope (10) as claimed in claim 2, characterized in that the mounts (33, 34) and the guide bush (25) are supported in mutually sliding manner.

4. Sighting telescope (1) as claimed in claim 2, characterized in that the guide bush (25) is supported in sliding manner in a helical sleeve (26).

5. Sighting telescope (10) as claimed in claim 4, characterized in that the helical sleeve (31) comprises a first helical slot (26) which supports a first drive pin (28) being guided along the longitudinal axis and a further helical slot (27) wherein a second drive pin (29) is supported and guided along the longitudinal axis.

6. Sighting telescope (10) as claimed in claim 5, characterized in that the first drive pin (28) is affixed in the first mount (33) and the second drive pin (29) is affixed in the second mount (34).

7. Sighting telescope (10) as claimed in claim 5, characterized in that the slots (26, 27) subtend curved paths.

8. Sighting telescope (10) as claimed in claim 1, characterized in that the target mark (14) is an illuminated dot.

\* \* \* \* \*